Sept. 12, 1972  H. BREUER  3,690,992
APPARATUS FOR PRESSING THE SEAMS OR SPLICES OF RAW TIRES
Filed Dec. 7, 1970  7 Sheets-Sheet 1

INVENTOR.
HUBERT BREUER
BY Norbert P. Holler
ATTORNEY

Sept. 12, 1972   H. BREUER   3,690,992
APPARATUS FOR PRESSING THE SEAMS OR SPLICES OF RAW TIRES
Filed Dec. 7, 1970   7 Sheets-Sheet 2

INVENTOR.
HUBERT BREUER
BY Norbert P. Holler
ATTORNEY

INVENTOR.
HUBERT BREUER

United States Patent Office 3,690,992
Patented Sept. 12, 1972

3,690,992
APPARATUS FOR PRESSING THE SEAMS OR SPLICES OF RAW TIRES
Hubert Breuer, Zweifall, Germany, assignor to Uniroyal Englebert Deutschland AG, Aachen, Germany
Filed Dec. 7, 1970, Ser. No. 95,492
Claims priority, application Germany, Dec. 20, 1969,
P 19 64 018.7
Int. Cl. B29h 7/08
U.S. Cl. 156—412                                14 Claims

ABSTRACT OF THE DISCLOSURE

A continuously running, turret-type apparatus for automatically and simultaneously stitching the rubber tread and sidewall seams or splices of several raw pneumatic tires in cylindrical or flat band form at a time, is disclosed. The vertical rotatable turret structure carries a star-shaped arrangement of a relatively large plurality of radial, horizontal, vertically aligned pairs of arms, of which the lower ones are designed for supporting raw tires being worked on, while the upper ones carry the respective automatically activated and deactivated fluid pressure cylinders for lowering and raising the associated air cushions or pressing bags toward and away from the underlying supporting arms. Raw tires are manually loaded into the apparatus one at a time, but ejection of pressed tires in like sequence is automatic. Power for rotating the turret structure and for operating in synchronism therewith the respective mechanisms by means of which the pressed tires are loosened and ejected from the various lower arms as the latter reach the unloading/loading station, is taken off a common drive mechanism.

---

This abstract is not to be taken either as a complete exposition or as a limitation of the present invention of the invention being discernible only by reference to and from the entire disclosure.

This invention relates to apparatus for pressing or stitching the rubber seams or splices of raw or uncured pneumatic tires in cylindrical carcass or flat band form.

Raw pneumatic tires built in flat band or cylindrical form generally include a carcass of tire cord fabric, in certain cases also a belt or breaker structure superposed generally medially thereon, and the rubber tread and sidewall stock, of which the tread portion overlies the medial region of the carcass (as well as the breaker structure, if any). The tread and sidewall stock, which may all be in one piece or may be constituted by several individual slabs or strips, is applied to the carcass by being wound about the latter (and the breaker structure, if any), and the opposite ends of such slab or slabs are brought together to create a seam or splice extending generally in the axial direction of the raw tire. For ease of reference, this rubber stock will hereinafter be referred to as tread rubber and the splices or seams therein as tread splices, it being understood that these terms include the sidewall portions within their scope, at such a seam, the abutting slab edges may be square cut and have their juncture disposed radially of the carcass, but usually they are oppositely beveled or skived and disposed in mutually overlying relation to improve the adhesion between the said edges and also for reasons of uniformity. Frequently, the tire builder will then exert pressure on the splice or seam with a hand tool, before removing the finished raw tire from the building drum, but manual pressing or stitching of the seam may turn out to be insufficient because, when the raw tire is subsequently ballooned into its toroidal shape in the vulcanizing press, it is greatly expanded in the circumferential direction and subjected to stresses capable of opening an inadequately cohering splice.

Most segments of the tire industry have, therefore, gone over to the use of machines for pressing the tread seams of raw tires. One type of apparatus which has been proposed for this purpose is a two-station apparatus provided with a vertical post or standard rotatably supporting a turret structure from which extends a pair of horizontal supporting arms onto each of which a raw tire band is adapted to be slipped, and with a pressing device located above each arm. A pressing device which has been found useful for this purpose includes an air bag or cushion consisting of a thick-walled elongated fabric-reinforced flexible rubber tube attached to a horizontal presser bar or foot extending parallel to the arm, the ends of the tube being closed by means of clamps, and the tube being filled with compressed air at a pressure of approximately 3 atmospheres gauge. The presser foot itself is secured to the lowermost free end of a vertical piston rod of a pressure cylinder and can therey be lowered together with the air bag toward the supporting arm located therebelow to act upon the tread seam of the raw tire mounted thereon. The pressure must be maintained for a period of approximately 1 minute in order to ensure the formation of an intimate bond of the raw material in the splice or seam area.

Each complete operating or working cycle consists of the steps of manually laying the respective raw tire onto an empty supporting arm, actuating the respective cylinder control to bring the associated pressing bag down against the tire band then on the arm and to retract the bag after a preset time interval, and manually removing the stitched raw tire band from the arm and depositing it on a conveyor by means of which it is taken away for storage and/or transfer to the curing room. The nature of the apparatus is such that the arm supporting one tire band is in the stitching station while the other arm is in the unloading/loading station for removal of a stitched tire band and insertion of an unstitched band in lieu thereof. It takes a sigle operator, however, to service an apparatus having at most two such arms. This mode of working thus is both a time-consuming and a high labor operation and, consequently, is correspondingly uneconomical.

It is the principal object of the present invention, therefore, to provide a novel and improved apparatus for stitching or pressing the tread splices or seams of raw pneumatic tires, by means of which the disadvantages and drawbacks of the known apparatus of this type can be efficaciously avoided.

More particularly, it is an object of the present invention to provide such a seam pressing or splice stitching apparatus which is capable of handling a relatively large number of tires at one time under the supervision of only a single operator, thereby to enable substantial operating economies to be achieved.

Another object of the present invention is the provision of such novel and improved splice stitching apparatus in which not only is the major part of each cycle of operation performed mechanically and automatically, with only loading being manual, but also each pressed raw tire is handled carefully during its removal from the respective supporting arm.

Generally speaking, the objectives of the present invention are attained by a turret-type apparatus having a relatively large plurality of pairs of horizontal, vertically aligned, radial arms, the lower ones of which are the supporting arms onto which the raw tires are manually telescopically fitted and hung one at a time as each arm passes the unloading/loading station. The overhanging upper arms are the supports for the respective pressure cylinders for effecting the up and down movements of the various pressing bags or air cushions. All of the pairs of arms are rigidly joined in a star-shaped arrangement to a common, vertical, hollow column or turret structure rotatable about a fixed vertical post. Each tire supporting arm is equipped with a mechanism for loosening therefrom the raw pressed tire which may have become adhered thereto during the stitching part of the total working cycle. At the unloading/loading station the apparatus is provided with a cam for operating the control valves associated with the respective cylinders to cause each of ths latter to retract its air cushion as the respective pair of arms reaches that station, and with an automatic ejection mechanism for displacing each loosened pressed tire off its supporting arm after the air cushion has been retracted. Power for driving the rotating turret structure, the loosening mechanism and the ejection mechanism in synchronism with each other is derived from a common drive mechanism.

The foregoing and other objects and characteristics, as well as the advantages, of the present invention will be more clearly understood from the following detailed description thereof when read in conjunction with the accompanying drawings, in which:

FIG. 8 is a fragmentary, partly sectional view, drawn to an enlarged scale, of the main drive mechanism and illustrates the driving connection to the ejector rod;

Figure 1:
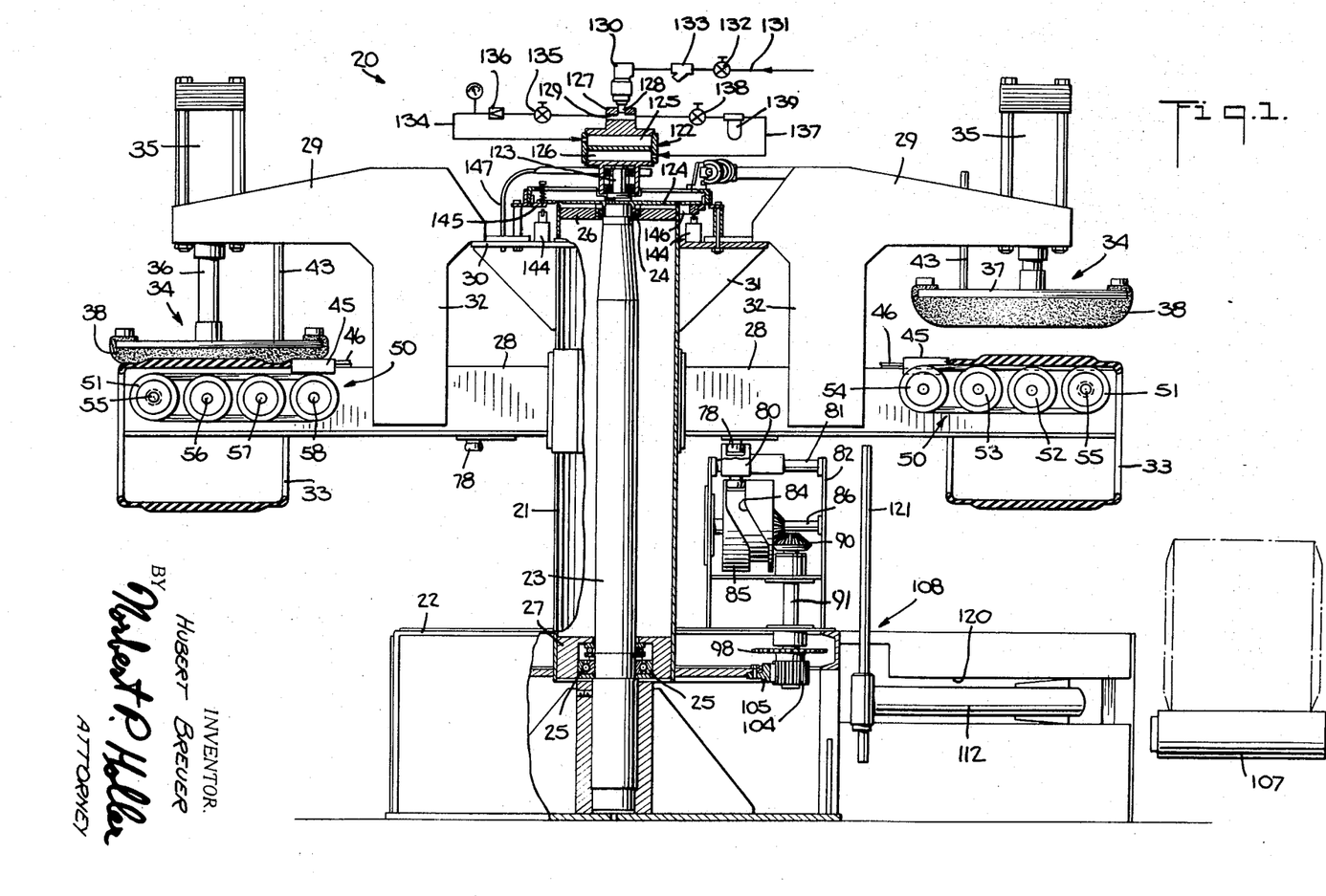
FIG. 1 is an elevational view, partly in section, of a splice or seam stitching apparatus according to the present invention, the main drive mechanism and certain other elements being omitted either entirely or in part or shown only diagrammatically for the sake of clarity.
Figures 9, 10:
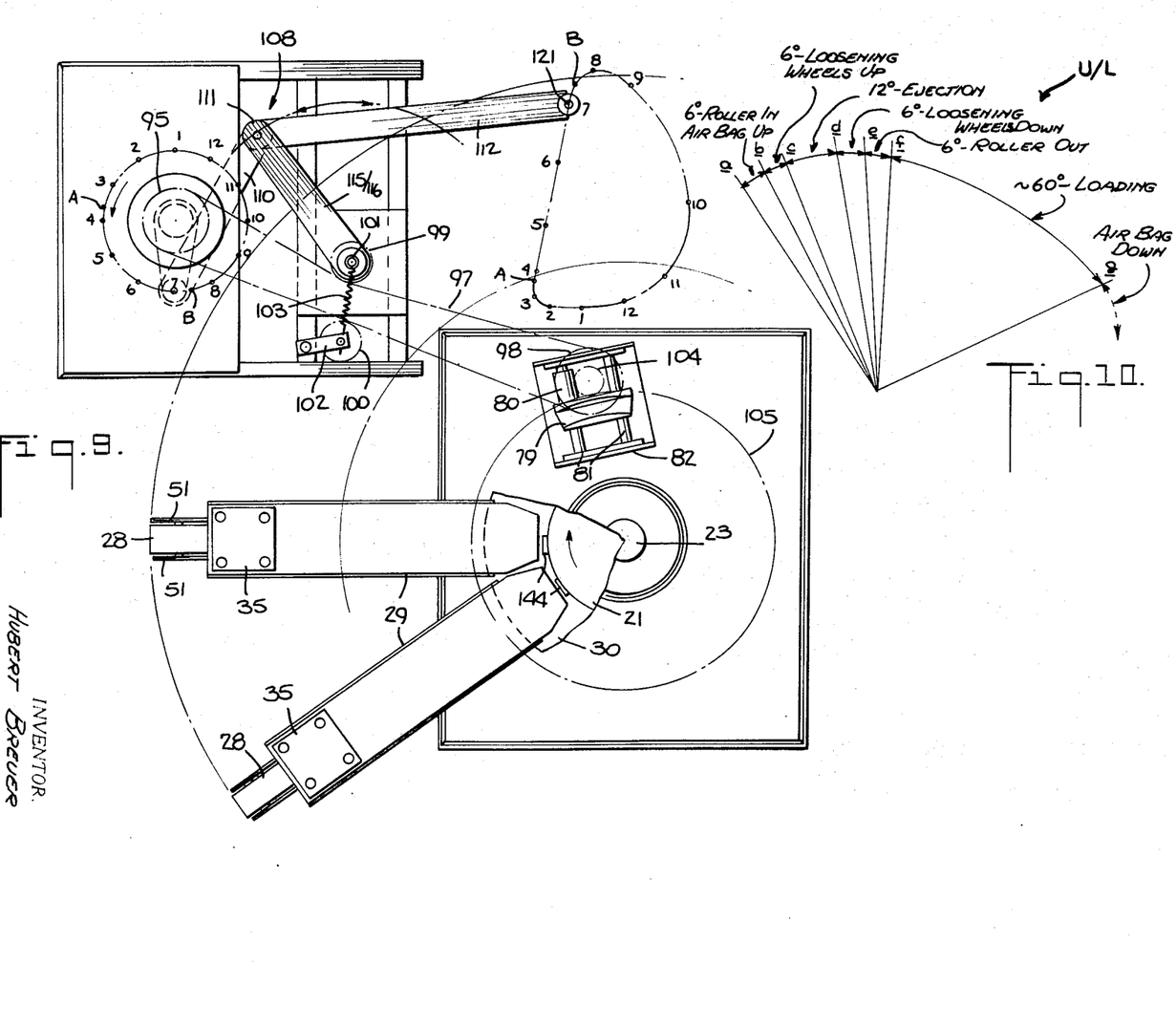
FIG. 9 is a fragmentary, schematic, top plan view of the structure shown in FIG. 8 and diagrammatically illustrates the activation of the loosening mechanism and the sequence of motions of the ejector rod.
FIG. 10 is a graphic representation of the sequence of operations occurring at the unloading/loading station of the apparatus.
Figure 11:
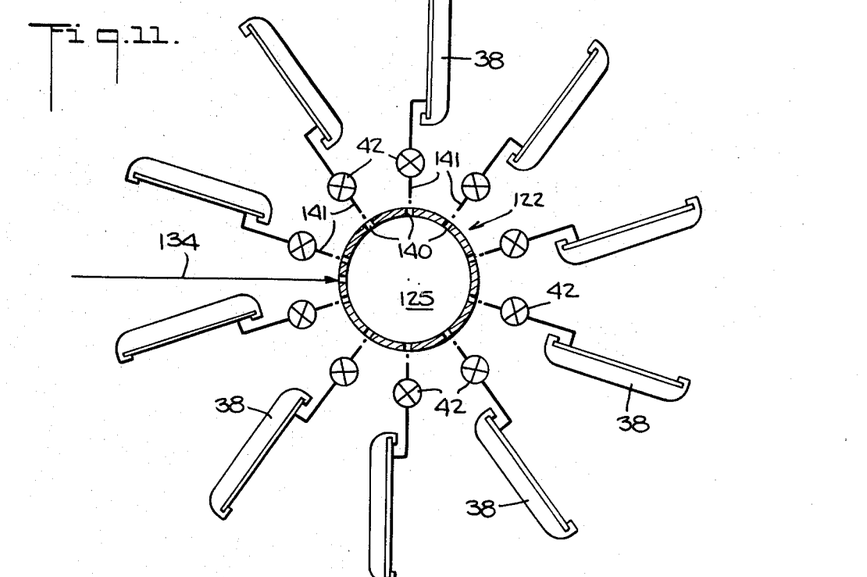
FIGS. 11 and 12 are diagrammatic sectional illustrations of two air distributor chambers constituting parts of the fluid pressure circuitry of the apparatus and show how compressed air is provided to the pressing bags and to the operating cylinders therefor, respectively.
Figure 12:
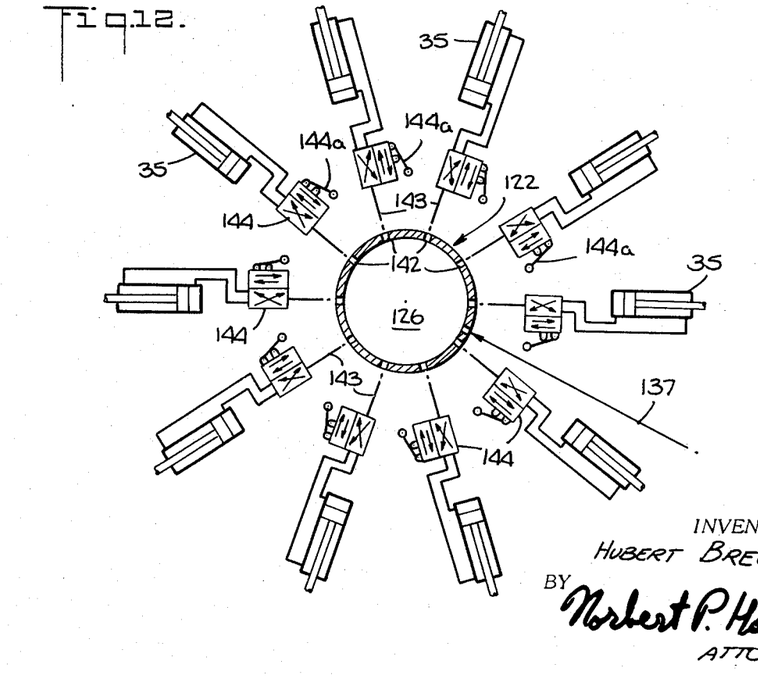

Referring now to the drawings in greater detail, and in particular to FIG. 1, the stitching apparatus 20 according to the present invention comprises a vertical column or turret structure 21 which is shown in the form of a hollow cylinder extending upwardly from the base structure 22 of the apparatus concentrically with a vertical stationary post or shaft 23 on which it is journaled by means of bearings 24 and 25 interposed between the shaft and the end closures 26 and 27 of the cylinder. Rigidly secured to the column 21 peripherally thereof and intermediate its ends is a plurality of horizontal, radially extending lower arms 28 of hollow rectangular construction (ten in the illustrated form of the invention), and a like plurality of upper arms 29 of upwardly open channel-like construction is rigidly secured to the column 21 adjacent its top end by means of an annular platform 30 stiffened by suitably peripherally spaced braces 31. The arms 29 overhang and are in vertical alignment with the respective lower arms 28 (see also FIGS. 2 and 9) and are rigidly interconnected with the latter by means of hollow stiffening members 32 disposed generally medially of the arms 28, the outer regions of both the lower arms 28 and the upper arms 29 thus being cantilevered freely.

As shown, the lower arms 28 are the means for telescopically supporting at their outermost end regions the respective raw tires 33 the tread (and sidewall) seams of which are to be pressed and stitched, while correspondingly the upper arms 29 are the means for supporting the respective pressing devices 34. Each pressing device comprises a double-acting fluid pressure cylinder 35 rigidly bolted to the outermost end region of a respective one of the arms 29, with its piston rod 36 extending downwardly and having a crosshead or bar 37 secured to its free end. A flexible tube 38 of rubber, generally fabric-reinforced in a manner well known in the art, is secured to the bottom face of the bar 37 by means of a plate 39 and bolts 40, the ends of the tube being sealed in an air-tight manner by suitable clamping devices 41. The tube 38 thus constitutes an air bag or pressing cushion for the inflation of which a valve 42 is provided in the bar 37 to enable compressed air to be admitted into the tube from a source to be more fully described hereinafter. The bar 37 is oriented parallel to the longitudinal dimensions of the arms 28 and 29 and further carries an upstanding guide rod or like member 43 extending slidably through an opening 44 in the bottom frame member 29a of the arm 29, to inhibit any twisting or rotary motion of the piston rod 36 and the presser bar/air bag combination 37–38 out of its proper operating orientation.

Figures 2, 5:
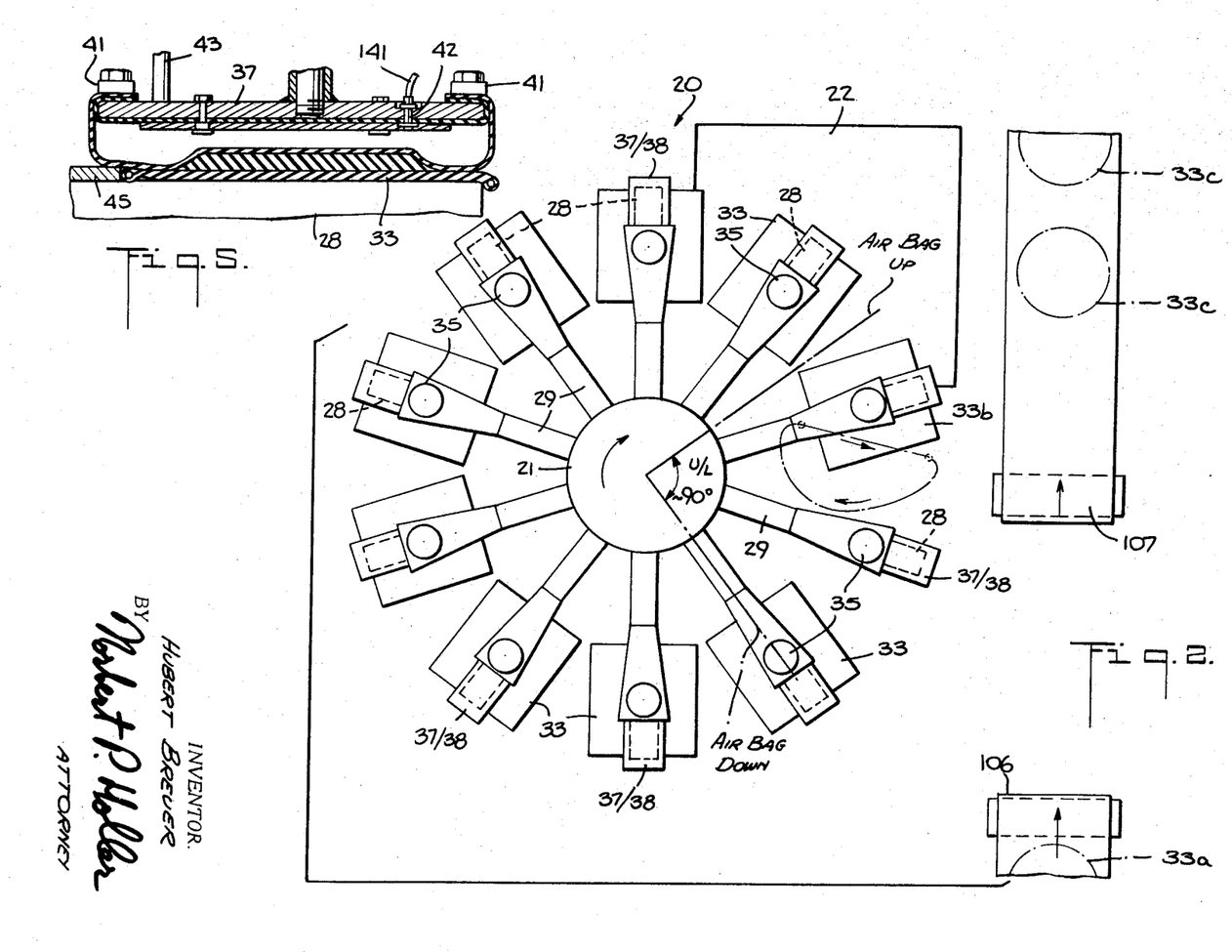
FIG. 2 is a fragmentary, schematic and partly diagrammatic top plan view of the apparatus shown in FIG. 1.
FIG. 5, found on the same sheet as FIG. 2, is a fragmentary sectional view, partly in elevation and drawn to an enlarged scale, of the pressing bag and tire supporting arm shown in FIG. 3 during the stitching part of the working cycle.
Figures 3, 4:
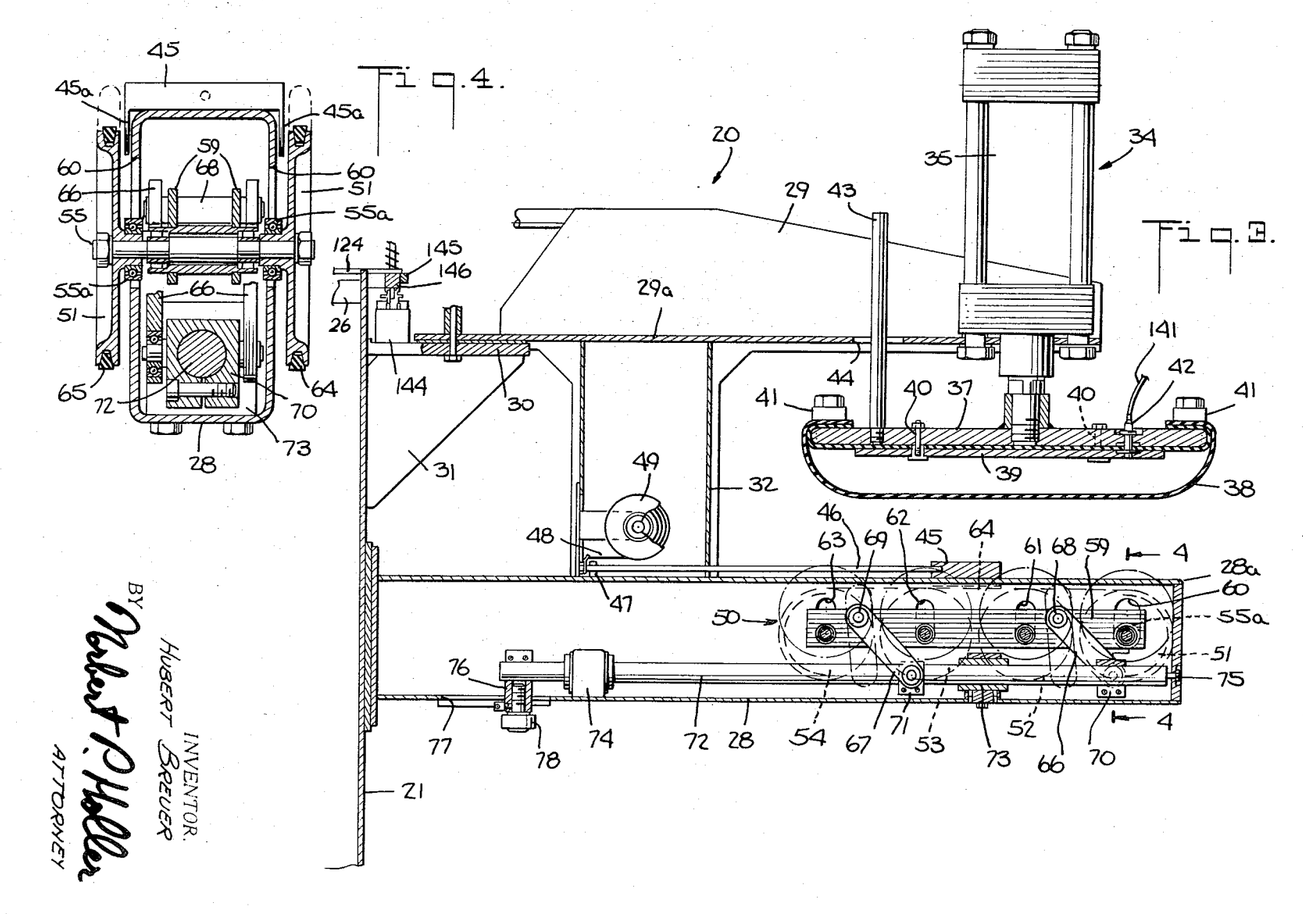
FIG. 3 is a fragmentary sectional view, partly in elevation and drawn to an enlarged scale, of one of the pairs of arms for supporting a tire and the associated pressing and loosening mechanisms of the apparatus, the elements being shown in their positions at the unloading/loading station shortly prior to the loading of a fresh tire into the apparatus.
FIG. 4 is a sectional view taken along the line 4—4 in FIG. 3.

Slidably mounted atop each of the lower turret arms 28 is a block-shaped abutment member 45, preferably made of a hard synthetic plastic material having a low coefficient of sliding friction (e.g. polytetrafluoroethylene or the like), which is connected at its rear end with a rod 46 extending freely through the stiffening member 32 and slidably through a guide block 47 (FIG. 3). At its free end, the rod 46 is connected via a cable 48 to a spring-biased reel or like device 49, whereby the abutment member 45 is continually lightly biased outwardly along the arm 28. The member 45 is laterally guided on the arm 28 by means of a pair of downwardly depending flanges 45a (FIG. 4) slidably engaging the sides of the arm. In use, therefore, the member 45 will always be in engagement with the rear or inwardmost bead end of the raw tire band 33 then suspended on that arm 28 (FIG. 1), but not with sufficient force to displace the tire band outwardly along the arm. The height of the abutment member 45 is such, as can be seen from FIGS. 1 and 5, that it functions to prevent the bead engaged thereby from being squeezed and deformed by the overlying portion of the pressing cushion 38 during the stitching operation. No such precaution need be taken at the other or outwardmost bead, which remains below the level of the top surface of the arm 28 just outside the rounded front endge 28a (FIG. 3) of the latter.

Each of the lower turret arms 28 is further provided with a loosening device 50 (FIGS. 1, 3 and 4) by means of which a pressed tire band 33 which, while supported on that arm, may have become stuck thereto during the rubber covering the interior of the tire carcass, can be released from the surface of the arm 28. As clearly shown, each loosening device 50 comprises a plurality of pairs of peripherally grooved wheels or rolls 51 to 54 located exteriorly of the arm 28 at the opposite sides thereof and secured to respective common parallel axles 55 to 58 which are journaled in a pair of mounting bars 59 extending longitudinally of the arm interiorly thereof. The axles 55 to 58 pass through, and are arranged for vertical reciprocal displacement relative to the arm 28 by means of, a plurality of aligned pairs of slots 60 to 63 in the opposite side walls of the arm. The guide slots for one of these axles, preferably the slots 60 for the outermost axle 55, are somewhat wider than the others to accommodate a pair of ball bearings 55a mounted on that axle for the purpose of minimizing the frictional effects resulting from the centrifugal forces exerted on the axles, as well as on all components of the loosening device, during the rotation of the turret structure 21. Two V-belts 64 and 65 are trained about the two sets of wheels 51 to 54.

Each loosening device 50 further comprises (FIGS. 3 and 4) two pairs of parallel linkage levers 66 and 67 located interiorly of the arm 28 and articulated at their upper ends to a pair of common axles 68 and 69 secured at spaced locations to the mounting bars 59. At their lower ends, the levers 66 and 67 are articulated to a pair of collars 70 and 71 clamped to a pull rod 72 longitudinally slidably mounted within the arm 28 by means of a pair of bearing blocks 73 and 74. The levers 66 and 67 are so arranged that the rollers or wheels 51 to 54 are in their down position when the pull rod 72 is in its forwardmost position with its front end abutting against a set screw or like stop member 75 mounted in the front end wall of the arm 28.

Fixed to the pull rod 72 at its rear or inwardmost end is a transverse tubular arm 76 (FIG. 3) which projects downwardly through a slot 77 in the bottom wall of the turret arm 28 and at its lowermost end supports a follower roller 78. The roller 78 is adapted to be slidingly received in an arcuate recess or groove 79 (FIGS. 1, 6 and 9) of circular curvature, concentric with the turret axis, provided in the upper surface of a slide member 80 mounted for reciprocal sliding movement along a pair of parallel rails 81 fixedly supported at the top of an auxiliary housing or framework 82 located on the base 22 of the apparatus.

Figure 6:
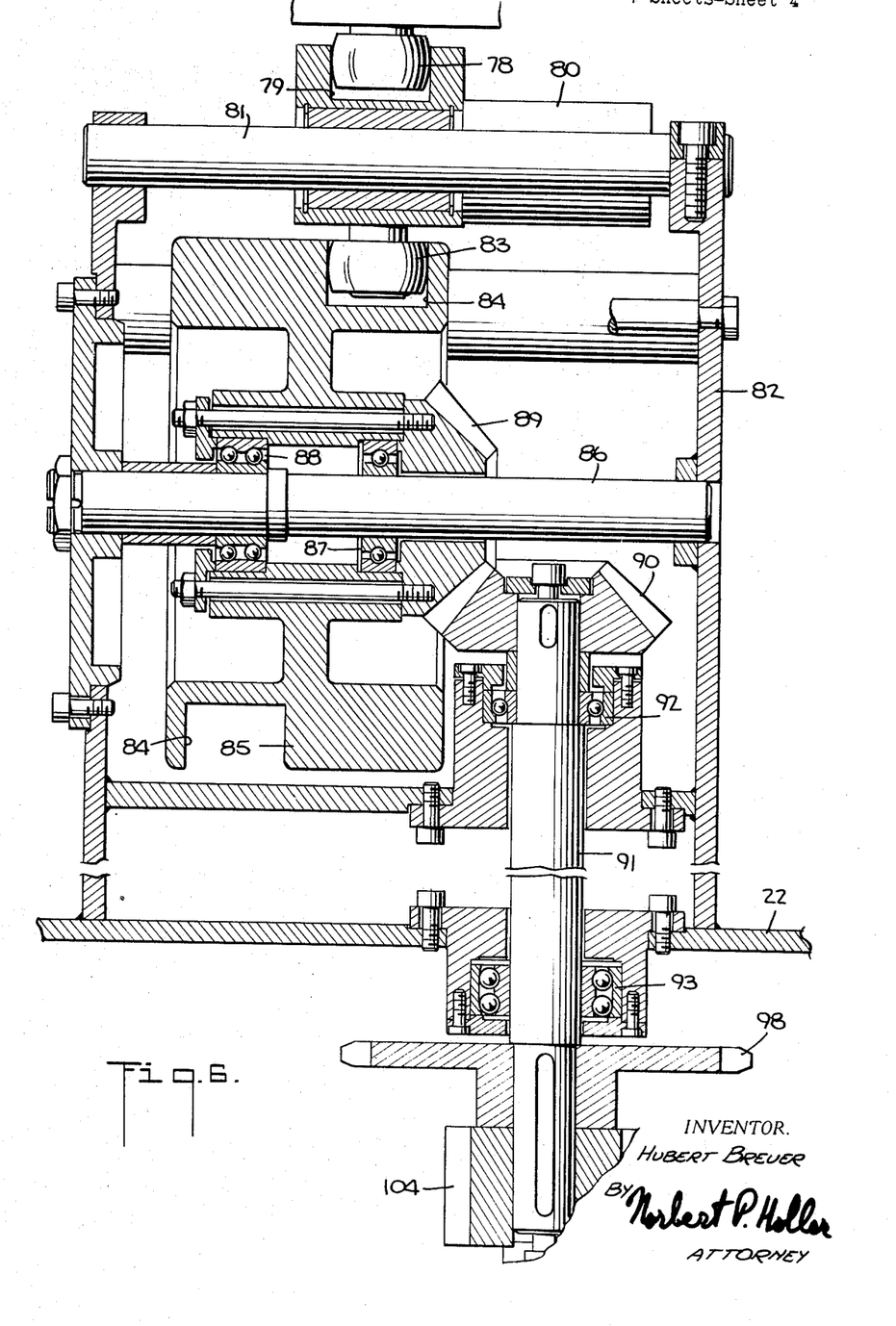
FIG. 6 is a fragmentary sectional view, drawn to an enlarged scale, of the operating means for the loosening mechanism but in a different stage of operation than that shown in FIG. 1.
Figures 6, 7:
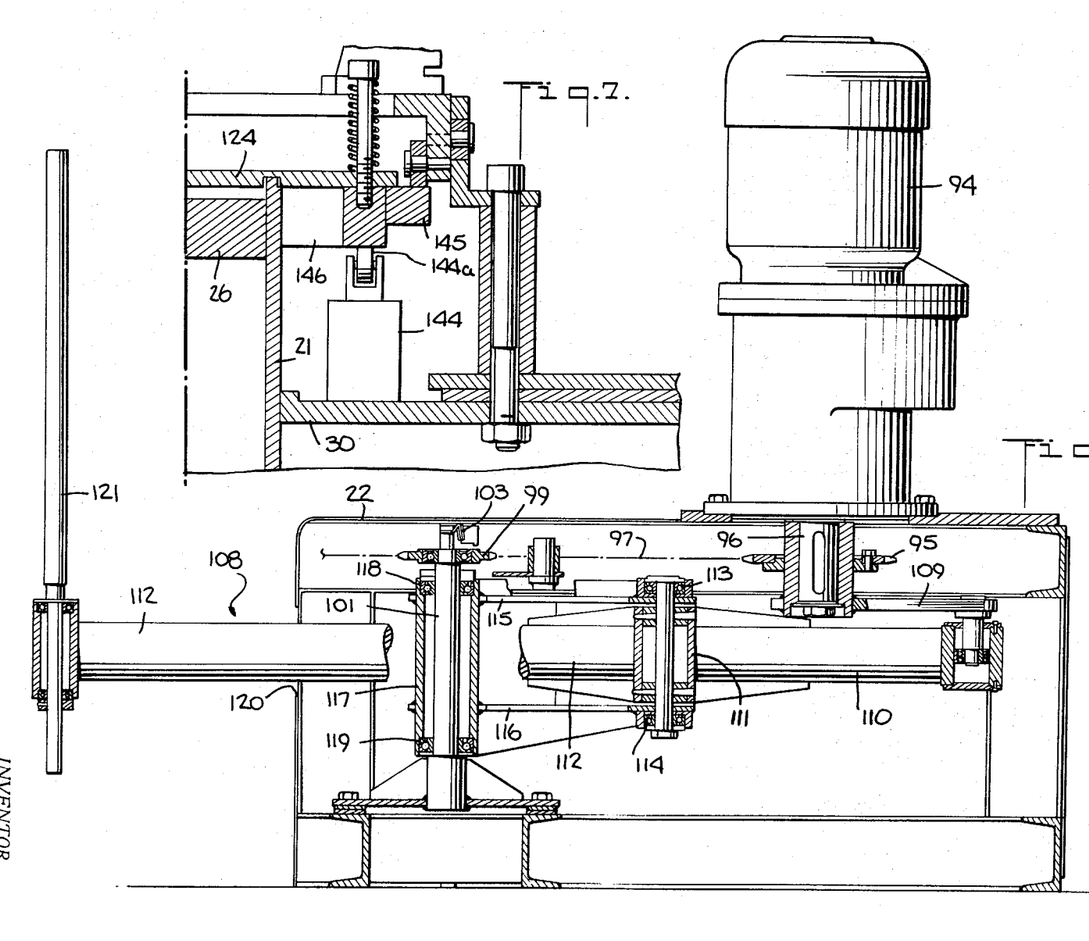
FIG. 7 is a fragmentary sectional view of the cam and control valve means for effecting the retraction of the pressing bag at the unloading/loading station of the apparatus.

It will be apparent, therefore, that when the slide member 80 is in the forward position, as shown in FIGS. 3 and 6 (the same condition exists in the case of the turret arm 28 shown at the left in FIG. 1), the rod 72 is likewise in its forward position, the linkage levers 66 and 67 are in their solid-line positions, and the wheels 51 to 54 are in their own position. On the other hand, when the slide member 80 is retracted from the position shown in FIG. 6 and into that shown in FIG. 1, the push rod 72 is likewise retracted, the linkage levers are in their nearly vertical broken-line positions, and the wheels 51 to 54 are in their up positions shown in phantom outline in FIGS. 3 and 4. In this state, the wheels and the upper reaches of the belts 64 and 65 project beyond the top surface of the arm 28, enabling any tire band 33 supported thereon to be lifted and loosened from the arm and easily moved therealong during an ejection operation. In this connection it should be noted that the belts 64 and 65 provide linear regions of contact with the tire band and thus avoid the exertion of localized forces thereon during a loosening operation, and they also avoid the possibility of the band getting caught between the tandem series of wheels on either side of the turret arm during the subsequent ejection operation. The particular linkage system used for raising and lowering the wheels 51 to 54 also has the advantage that it is impossible for an inadvertent raising of the wheels during the pressing or stitching stage to occur, since while the turret is rotating, centrifugal forces will tend to urge the push rod 72 continuously against the abutment or stop member 75 so as to remain in its forward position.

For the purpose of moving the slide member 80 and the pull rod 72 as described, the slide member carries a downwardly depending follower roller 83 which is received in a peripheral groove 84 of a vertical cam disc 85 rotatably mounted on a fixed horizontal shaft 86 in the housing 82 by means of bearings 87 and 88. Secured to the cam disc 85 coaxially therewith is a bevel gear 89 which is in mesh with another identical bevel gear 90 secured to the top end of a vertical shaft 91 journaled in the housing 82 by means of bearings 92 and 93. The shaft 91 is rotated by the main drive motor 94 (FIG. 8), seated on the base 22 of the apparatus, via a sprocket wheel 95 secured to the motor shaft 96, a sprocket chain 97 (FIG. 9) and a sprocket wheel 98 secured to the shaft 91. The gear ratio of the two sprocket wheels is 1:1. Intermediate its end regions, the sprocket chain 97 is in mesh with a pair of idler sprocket wheels 99 and 100, the former being journaled on a vertical shaft 101 (FIG. 8) fixed in the base 22, and the latter being supported by a horizontal pivot ram 102 (FIG. 9) biased toward the shaft 100 by a spring 103.

The shaft 91 at its bottom end further carries a pinion or small spur gear 104 (FIGS. 1, 6 and 9) which is in mesh with a large spur gear 105 secured to the lowermost end of the column or turret structure 21, the gear ratio here, in view of the illustrated 10-armed nature of the apparatus, being 1:10. Thus, for each full rotation of the turret structure, the cam disc 85 rotates through ten full turns and thereby reciprocates the slide member 80 ten times from the position thereof shown in FIG. 1 to the position shown in FIG. 6 and back. The purpose of these functional interrelationships will be more fully explained hereinafter in connection with the description of the operation of the apparatus.

Referring now to FIG. 2, during each full rotation of the turret structure 21, the individual pairs of upper and lower arms 28–29 are moved in sequence through an unloading/loading station, which will hereinafter in general be referred to as the U/L station, occupying an approximately 90° section of the total 360° path of movement of each pair of arms. At the U/L station, where two conveyor belts 106 and 107 are shown as the means for bringing unpressed tire bands to the apparatus 20 and transporting pressed tire bands away from the apparatus, respectively, (quite obviously, other suitable means such as trucks or dollies, overhead conveyor chains, etc., may be used in lieu thereof) the apparatus is provided with an ejection mechanism 108 (FIGS. 1, 8 and 9) for displacing each pressed tire band from its respective supporting arm 28 as the latter reaches the U/L station. The mechanism 108 comprises a crank arm 109 located within the base 22 and connectd at one end to and driven by the output shaft 96 of the main drive motor 94. At its other end, the crank arm 109 is articulated to one end of a horizontal link member 110 the other end of which is fixed to a vertical joint 111. Also fixed to the joint 111 is one end of a horizontal lever arm 112 which extends at an angle to the link member 110 (FIG. 9), the elements 110 and 112 thus effectively constituting a bell-crank lever. The joint 111, which constitutes the fulcrum of the bell-crank lever, is rotatably supported, through the intermediary of a pair of bearings 113 and 114 (FIG. 8), at one end of a pair of vertically aligned, horizontal bracket arms 115 and 116 which are fixed at their other ends to a vertical sleeve 117 journaled by means of bearings 118 and 119 to the shaft 101. The lever or bell-crank arm 112 projects freely out of the base 22 via an elongated slot-shaped opening 120 (see also FIG. 1) and at its free end rotatably supports a vertical ejector rod 121 which extends up to just below the plane of movement of the bottom surfaces of the lower turret arms 28.

It will be apparent that since the crank arm 109 is driven directly by the motor 94, it will rotate ten times about its axis 96 and thus will cycle the ejector rod 121 ten times during each complete rotation of the turret structure 21. The actual resultant translational movement of the rod 121 is in a generally semi-circular path and may be considered as starting at a point A (FIG. 9) located approximately below the position in which the vertical stiffening member 32 of a pair of arms 28–29 which has just shortly before entered the U/L station would be located (see also FIGS. 1 and 2). This starting location of the ejector rod should be sufficiently far back, of course, to accommodate the largest size tire bands to be processed in the apparatus 20. From the point A, the rod moves outwardly in a straight line obliquely to the radial direction at increasing speed to a point B located just short of the locus of the outer ends of the supporting arms 28. The various elements of the system are then in the positions thereof shown in FIG. 9. From the point B, the ejector rod moves back to point A along a wide semi-circular arc, its speed of movement slowing down to its smallest value shortly before the rod again arrives at point A. For the entire cycle, the corresponding points of the circular crank arm movement and the semi-circular ejector rod movement are designated by the numerals 1 to 12 in FIG. 9. The path of movement of the ejector rod from A to B is so chosen that the rod 121, upon coming into contact, in the vicinity of point A, with a pressed tire band 33 on an arm 28, pushes the band outwardly along the arm at increasing speed while the revolving movement of the arm continues and without the occurrence of any relative motion between the ejector rod and the tire band 33. Thus, the point of contact between the ejector rod and the tire band, once established in the vicinity of point A, does not shift during the ejection stroke, which ensures that the ejection force is always applied to the tire band at the most favorable spot, so that the band will not cant and bind or jam during the ejection operation.

Referring now to FIGS. 1, 7, 11 and 12, the fluid pressure circuitry for the cylinders 35 and air bags 38 of the apparatus 20 comprises a distributor structure 122 rotatably journaled on a stationary vertical shaft member 123 which is seated atop a horizontal plate 124 and together with the latter is rigidly bolted to the top end of the stationary vertical shaft 23. The distributor structure 122 is shown as being in the form of a single housing divided by a medial partition into two horizontal chambers 125 and 126 in superposed relation to each other, having above the chambers a boss 127 provided with an axial inlet port 128 communicating with a transverse bore or duct 129. Compressed air taken from the compressed air main of the plant and reduced to about 7 atm. gauge is fed into the distributor structure via a rotary coupling 130 (FIG. 1) establishing communication between the inlet port 128 and a line 131 having a shut-off valve 132 and a filter 133 incorporated therein. In the boss 128, the air flow divides, going via the duct 129 in part into a line 134 leading to the chamber 125 (see also FIG. 11) and having incorporated therein a shut-off valve 135 and a pressure reducing valve 136 set to drop the air pressure to about 3 atm. gauge, and in part into a line 137 leading to the chamber 126 (see also FIG. 12) and having incorporated therein a shut-off valve 138 and an air lubricator or oil cup 139. From the distributor chamber 125 the lower pressure air flows through a plurality (here ten in number) of radial ports 140 (FIG. 11) into respective lines 141 leading via the associated valves 42 (see also FIG. 3) to the various air bags or pressing cushions 38. Similarly, from the distributor chamber 126 the higher pressure air flows through the appropriate number of radial ports 142 (FIG. 12) into respective lines 143 leading via respective 4/2-way slide or control valves 144 to the cylinders 35 for raising and lowering the air bags or pressing cushions 38. It will be understood that the two pressures can be adjusted an any desired values other than those given above, and that the air bags remain inflated at all times, with the valves 42 enabling replenishment of the inflation pressure as needed in case of leakage losses.

The valves 144 are physically located on and fixed to the annular platform 30 (FIGS. 1, 3 and 7) in radial alignment with the respective pairs of turret arms 28–29 (FIG. 2) and below the stationary plate 124, each valve having its roller-ended operating lever 144a projecting upwardly toward the plate 124. Secured to the latter along its periphery is a ring member 145 which is provided, in the region thereof facing the U&L station, with a downwardly projecting cam portion 146 disposed in the path of movement of and thus adapted to be engaged by the operating lever 144a of each of the valves 144 as the same traverses the U/L station. Concomitantly, the distributor structure 122 is interconnected with the platform 30 by means of an entrainment strap 147 (FIG. 1) or the like, ensuring that the valves 14 and the distributor structure move as a unit without relative motion therebetween. The setting of the valves 144 is such that when the lever 144a of any given valve is depressed from its normal position by the cam 146, that valve directs the higher fluid pressure into the piston rod side of the respective cylinder 35 and vents the position bottom side, thereby causing the associated air bag to be retracted from the underlying turret arm 28 and tire band 33 supported thereby. On the other hand, when the operating level of any given value 144 is in its normal position, as is the case whenever the valve is out of the range of action of the cam 146, that valve directs the fluid pressure into the piston bottom side of the respective cylinder 35 and vents the piston rod side, causing the associated air bag 38 to be lowered against and into pressure-applying relation to the tire band then supported on the underlying turret arm 28.

The operation of the stitching apparatus 20 according to the resent invention is as follows:

It is assumed that the apparatus has been running for some time and that the operator is just loading an unpressed raw tire band taken from the conveyor 106 and designated 33a in FIG. 2 onto an empty one of the ten turret arms 28 at the U/L station, which he does simply telescoping the band, with the seam facing up, onto the arm so that the innermost of leading bead abuts against the member 45 and until the inside of the outermost or trailing bead engages the rounded outermost top edge 28a of the arm.

Just prior to this taking place, the next arm 28, on which another tire band, designated 33b in FIG. 2, is supported and pressed down by the associated overhead air bag 38, reaches an angular position which puts it at the entrance end of the U/L station. This position is designated by the line a in FIG. 10. At this point and as the said next arm continues through the next 6° of its rotary movement to the position designated by the line b, the roller 78 thereof enters the arcuate groove 79 in the slide member 80, which at that time is in the position shown in FIG. 6, while simultaneously the associated valve lever 144a comes into engagement with and is depressed by the crest of the cam 146 to activate the respective cylinder 35 so as to retract the air bag or pressing cushion 38 upwardly from the tire band. Concurrently, of course, the ejector rod 121 is in the process of moving back from point B (FIG. 9) toward point A along the arcuate portion of its path of movement, and the roller 78 of the aforesaid empty turret arm is leaving the groove 79 in the slide member 80.

After the arm has reached position b and as it continues through another 6° of movement, the continuing rotation of the cam disc 85 causes the slide 80 to be moved rearwardly, i.e. radially inwardly of the apparatus and from the FIG. 6 position to the position shown at the right in FIG. 1, by virtue of the engagement of the follower roller 83 of the slide member in the cam groove 84 of the disc. This correspondingly retracts the pull rod 72 and shifts the linkage levers 66 and 67 into their broken-line positions shown in FIG. 3, whereby the wheels 51 to 54 and their belts 64 and 65 are raised to the broken-line positions shown in FIG. 4 and act to loosen and strip the tire band 33b from the surface of the arm. A displacement of the loosening wheels and belts of the order of magnitude of about 2 to 3 cm. is found sufficient. The loosening operation is completed as the arm reaches the position designated by the line c, at which time also the ejector rod is just reaching the point A.

For the next 12° of rotary movement of the arm 28, the loosening wheels remain up as the cam groove 84 dwells in its FIG. 1 position, while the ejector rod is moved from point A to point B along the straight portion of its path of movement. Substantially at point A, of course, the rod 121, still traveling relatively slowly, first comes into engagement with the innermost bead end of the tire band 33b, so that during its subsequent linear movement the rod pushes the pressed tire band off the arm and right onto an empty portion of the conveyor 107 behind previously unloaded pressed tire bands designated 33c in FIG. 2. The speed of movement of the ejector rod 121 increases during this interval, and the obliquity of its path of movement ensures that its point of contact with the tire band does not shift during the ejection stroke. The displacement of the tire band 33b off the arm, which is greatly facilitated by its being supported by the belts and wheels of the loosening device, is completed when the arm reaches the position designated by the line d in FIG. 10.

In the following 6° of the rotary movement of the arm 28 from the position d to the position designated by the line e, the continuing rotation of the cam disc 85 brings the same and its cam groove back to the FIG. 6 position thereof, which causes the slide member 80 and the pull rod 72 to be moved forwardly or radially outwardly again so as to lower the loosening wheels and belts back into the solid-line positions thereof shown in FIG. 4. Thereafter, while the arm moves through another 6° of its rotary path up to the position designated by the line f, the roller 78 traverses the last portion of the groove 79 and leaves the same. Again simultaneously therewith, the roller 78 of the next arm 28 enters the groove 79 of the slide member 80 preparatory to the repetition of the foregoing steps by the said next arm. The just unloaded arm is now ready for a loading operation, in which another unpressed and unstitched tire band is manually placed thereon by the operator in the manner previously described. The loading operation is effected while the arm moves through an arc of about 60° from the position f to the position designated by the line g in FIG. 10. At that point, the valve 144 associated with that arm reaches the end of the cam 146, which permits its operating lever to return to its normal undepressed state, thereby activating the cylinder 35 to lower the air bag against the seam portion of the newly loaded tire band.

The speed of rotation of the turret structure 21 is set at 1 r.p.m. for the illustrated 10-armed apparatus. Each arm 28 thus remains in the U/L station for the unloading and loading portion of its cycle for about 15 seconds. Correspondingly, each arm remains out of the U/L station for the stitching portion of its cycle for about 45 seconds, which interval has been found adequate for a satisfactory stitching operation.

It will be seen from the foregoing that the construction of the apparatus according to the present invention enables the actions of the operator to be restricted to loading the raw tires to be pressed into the apparatus, while the pressing operation and the subsequent loosening and ejection of the tires take place automatically and in a continuous sequence. A substantial increase in output and productivity thus is achieved thereby. Concomitantly, the pressed raw tires being removed from the respective supporting arms are always taken off or pushed off correctly, carefully and non-injuriously, since predetermined conditions of motion are maintained. The derivation of all main and auxiliary motions involved in the handling of the tire bands in the apparatus, mechanically from one common main drive mechanism, ensures the absolute synchronization of the various motions. Moreover, since the apparatus according to the present invention permits the provision of a multiplicity of supporting arms with associated pressing devices on the rotating column, a multiplicity of raw tires can be treated in quick succession while the prescribed operating conditions are maintained.

It should also be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

Having thus described the invention, what is claimed and desired to be protected by Letters Patent is:

1. An apparatus for stitching the tread seams or splices of raw tires in cylindrical band form, comprising a rotatable turret structure along about one-fourth of the total 360° of rotary movement of which is defined an unloading/loading station and along the remaining three-fourths of said rotary movement of which is defined a stitching station, a star-shaped arrangement of tire band supporting arms rigidly secured to said turret structure and movable therewith, respective air bag pressing means supported by said turret structure and operable for pressingly engaging the tread splice regions of unstitched raw tire bands supported on the associated arms at all times during said rotary movement of said turret structure except when said arms are within the confines of said unloading/loading station, means for automatically loosening each stitched raw tire band from the surface of its respective supporting arm upon the latter entering said unloading/loading station, and ejection means located at said unloading/loading station and operable automatically to displace each previously stitched and loosened raw tire band off its respective supporting arm upon the latter reaching a predetermined section of said unloading/loading station.

2. An apparatus for stitching the tread seams or splices of raw tires in cylindrical band form, comprising a rotatable turret structure along about one-fourth of the total 360° of rotary movement of which is defined an unloading/loading station and along the remaining three-fourths of said rotary movement of which is defined a stitching station, a star-shaped arrangement of a plurality of pairs of rigid, vertically aligned, horizontal arms rigidly secured at their innermost ends to said turret structure and movable therewith, the lower one of each of said pairs of arms being sufficiently narrow in its outermost end region to enable a cylindrical raw tire band to be telescoped thereonto, a respective air bag pressing device supported by each of the upper ones of said pairs of arms in its outermost end region above said outermost end region of the associated underlying lower arm, means for controlling said pressing devices and operable to cause each air bag or cushion to be raised from an underlying stitched raw tire band upon the lower arm supporting that tire band entering said unloading/loading station, said controlling means being further operable to cause each air bag or cushion to be lowered pressingly against an underlying unstitched raw tire band upon the lower arm supporting the same leaving said unloading/loading station and to be maintained in such pressing relation until that arm again enters said unloading/loading station, a respective loosening device carried by each of said lower arms and each being selectively temporarily activatable, upon the respective lower arm entering said unloading/loading station, for breaking the adhesion of the inner rubber covering of a stitched raw tire band to the surface of the lower arm supporting the same, an ejector device located at said unloading/loading station and operable to displace a previously stitched and loosened raw tire band off the respective one of said lower arms each time the latter reaches a predetermined section of said unloading/loading station, and drive means for operating said turret structure, said loosening devices and said ejector device in synchronism and properly timed relation with each other.

3. Apparatus according to claim 2, said turret structure comprising a vertical hollow column rotatably journaled on a stationary vertical shaft located concentrically therewithin, and each two associated upper and lower arms being connected at their innermost ends to said column and being further interconnected with each other by a medial stiffening member.

4. Apparatus according to claim 2, said drive means comprising a common power source and three operating mechanisms driven thereby, one for said column, one for said loosening devices, and one for said ejector device, said operating mechanisms for said loosening and ejector devices being constructed and arranged to run as many complete cycles for each full rotation of said column as there are pairs of arms in said star-shaped arrangement.

5. Apparatus according to claim 2, each of said loosening devices comprising vertical wheel means, bearing bar means for said wheel means mounted on the respective lower arm for vertical reciprocal displacement relative thereto to shift said wheel means between up and down positions, said wheel means being arranged to be within the confines of a tire band when the same is supported by said respective lower arm, said wheel means when in said up position projecting beyond the tire band-engaging top surface of said respective lower arm and operating to strip a tire band then supported on that arm therefrom, a pull rod mounted on said respective lower arm for longitudinal reciprocal sliding movement relative thereto, and linkage lever means articulated between said bar means and said pull rod for effecting vertical displacements of said wheel means in response to longitudinal displacements of said pull rod.

6. Apparatus according to claim 5, further comprising respective stop means disposed at the outermost end of each of said lower arms for engagement by the outermost end of the associated pull rod when the same is in its outwardmost end position, the articulation of said linkage lever means to said pull rod and said bar means being arranged to dispose said wheel means in the down position upon said pull rod engaging said stop means.

7. Apparatus according to claim 5, the portion of said drive means for said loosening devices comprising motor-driven cam means located at said unloading/loading station, a slide member juxtaposed to said cam means and mounted for reciprocal movement radially of said turret structure, and first follower means carried by said slide member in continuous engagement with said cam means, each of said pull rods being provided with respective second follower means engageable with a camming portion of said slide member upon rotary movement of the respective lower arm through an initial portion of said unloading/loading station, thereby to enable said drive means, upon the latter causing appropriate displacements of said slide member, to effect corresponding longitudinal displacements of the associated pull rod and therethrough corresponding vertical displacements of the associated wheel means first into the up position thereof and then back into the down position thereof.

8. Apparatus according to claim 5, each of said wheel means comprising two sets of horizontally aligned wheels disposed on opposite sides of the respective lower arm, each wheel on one side being paried with a corresponding wheel on the other side, and a pair of endless belts each trained around a respective one of said sets of wheels.

9. Apparatus according to claim 8, said wheels being peripherally V-grooved, and said belts being V-belts.

10. Apparatus according to claim 2, said ejector device comprising a horizontal bell-crank lever having a laterally angularly reciprocally displaceable fulcrum intermediate its ends, and a vertical ejector rod carried by said bell-crank lever at one end thereof, the portion of said drive means for said ejector device comprising a motor-driven horizontally rotating crank arm articulated at its free end to the other end of said bell-crank lever, the physical parameters and relationships of the latter and said crank arm being arranged to effect a displacement of said ejector rod in its ejection stroke without any relative motion occurring between said ejector rod and a tire band engaged thereby during the entire time of such engagement.

11. Apparatus according to claim 2, further comprising a respective abutment member slidably arranged on the top surface of each of said lower arms, and respective spring means lightly biasing each of said abutment members toward the outermost end region of the respective lower arm so as to enable each abutment member to be engaged by and remain in contact with the innermost bead end of a tire band supported on that lower arm, the height of each abutment member being sufficient to limit downward movement of the overlying portion of the associated air bag during the stitching operation and thereby to prevent the exertion of excessive pressing forces on and consequent distortion of the portion of the respective tire band in the region of said innermost bead end thereof.

12. Apparatus according to claim 2, said controlling means ecomprising a respective pneumatic cylinder and piston combination supported on each of said upper arms and each having a downwardly projecting piston rod carrying the associated air bag at its bottom end, an air distribution device mounted on said turret structure and comprising a first cylindrical chamber provided with a set of peripherally spaced first outlet ports equal in number to said pairs of arms, said first chamber being further provided with an inlet port for admission of pressurized air, a plurality of first conduits having respective reversing control valves incorporated therein and establishing communication between said first outlet ports of said first chamber and the respective cylinders, each of said control valves being carried by said turret structure and equipped with a respective operating member, and a stationary cam member juxtaposed to said turret structure in said unloading/loading station and in the path of movement of said operating members of said control valves, said cam member activating each operating member coming in contact therewith to cause the respective control valve to direct air into the piston rod end of the corresponding cylinder for raising the associated air bag from the underlying stitched raw tire band.

13. Apparatus according to claim 12, said distribution device further comprising a second cylindrical chamber provided with a pressurized air inlet port and a set of peripherally spaced second outlet ports equal in number to said pairs of arms, and a plurality of second conduits having respective check valves incorporated therein and establishing communication between said second outlet ports of said second chamber and the respective air bags.

14. An apparatus for stitching the tread seams of splices of raw tires in cylindrical band form, comprising a rotatable turret structure along about one-fourth of the total 360° of rotary movement of which is defined an unloading/loading station and along the remaining three-fourths of said rotary movement of which is defined a stitching station, a first drive mechanism operatively connected with said turret structure for rotating the same, a star-shaped arrangement of a plurality of pairs of rigid, vertically aligned, horizontal arms rigidly secured at their innermost ends to said turret structure and movable therewith, the lower one of each of said pairs of arms being sufficiently narrow in its outermost end region to enable a cylindrical raw tire band to be telescoped thereonto, a respective pressing device rigidly supported by each of the upper ones of said pairs of arms in its outermost end region above said outermost end region of the associated underlying lower arm, each pressing device comprising a fluid pressure cylinder and piston combination supported by an upper arm and having a piston rod projecting downwardly and carrying at its free end a presser foot disposed parallel to the associated lower arm and supporting an inflated air bag or cushion for engaging the tread splice region of a raw tire band supported on said associated lower arm, means for controlling said pressing devices and operable to cause each air bag or cushion to be raised from an underlying stitched raw tire band upon the lower arm supporting that tire band entering said unloading/loading station, said controlling means being further operable to cause each air bag or cushion to be lowered pressingly against an underlying unstitched raw tire band upon the lower arm supporting the same leaving said unloading/loading station and to be maintained in such pressing relation until that arm again enters said unloading/loading station, a respective loosening device carried by each of said lower arms and selectively activatable for breaking the adhesion of the inner rubber covering of a stitched raw tire band to the surface of the lower arm supporting the same, a second drive mechanism arranged for selective sequential connection with and disconnection from each of said loosening devices upon the respective lower arm carrying the same entering and leaving an initial section of said unloading/loading station, an ejector device located at said unloading/loading station and arranged for executing both an ejection movement from a radially inwardmost starting position to a radially outwardmost end position and a return movement to said starting position, a third drive mechanism arranged for displacing said ejector device sequentially through said ejection and return movements thereof each time a respective one of said lower arms supporting a previously stitched and loosened raw tire band reaches a predetermined section of said unloading/loading station, and a common power source for operating said first, second and third drive mechanisms and therethrough said turret structure, said loosening devices and said ejector device in synchronism and properly timed relation with each other.

References Cited
UNITED STATES PATENTS

| | | | |
|---|---|---|---|
| 2,995,177 | 8/1961 | Tolonen | 156—394 |
| 2,208,324 | 7/1940 | Haase | 156—408 X |
| 2,407,152 | 9/1946 | Haase | 156—396 X |
| 2,028,078 | 1/1936 | State et al. | 156—396 X |
| 2,071,716 | 2/1937 | Wikle | 156—396 |

RALPH S. KENDALL, Primary Examiner

U.S. Cl. X.R.

156—396

PO-1050
(5/69)

UNITED STATES PATENT OFFICE
CERTIFICATE OF CORRECTION

Patent No. 3,690,992           Dated September 12, 1972

Inventor(s) Hubert Breuer

It is certified that error appears in the above-identified patent and that said Letters Patent are hereby corrected as shown below:

Column 1, line 38, after "present invention" read --, however, the full nature and extent--; line 61, for "scope, at" read --scope. At--. Column 2, line 39, for "sigle" read --single--. Column 4, line 70, for "endge" read --edge--; line 74, after "the" read --stitching operation by virtue of the tackiness of the--. Column 5, line 53, for "own" read --down--. Column 6, line 24, for "ram" read --arm--; line 56, for "connectd" read --connected--. Column 7, line 52, before "having" read --and--. Column 8, line 3, for "an" read --to--; line 14, for "U&L" read --U/L--; line 27, for "position" read --piston--; line 30, for "level" read --lever-- and for "value" read --valve--; line 39, for "resent" read --present--; line 44, before "simply" read --by--; line 46, for "of" read --or--. Column 11, line 69, for "paried" read --paired--. Column 12, line 59, for "of" read --or--.

Signed and sealed this 25th day of December 1973.

(SEAL)
Attest:

EDWARD M. FLETCHER, JR.
Attesting Officer

RENE D. TEGTMEYER
Acting Commissioner of Patents